Sept. 29, 1925.

L. S. HARBER 1,555,116

ADJUSTABLE DELIVERY PLATE FOR TRAVELING OVENS

Filed Nov. 28, 1923    3 Sheets-Sheet 1

INVENTOR
LAURENCE S. HARBER
BY
Newell + Spencer
ATTORNEYS

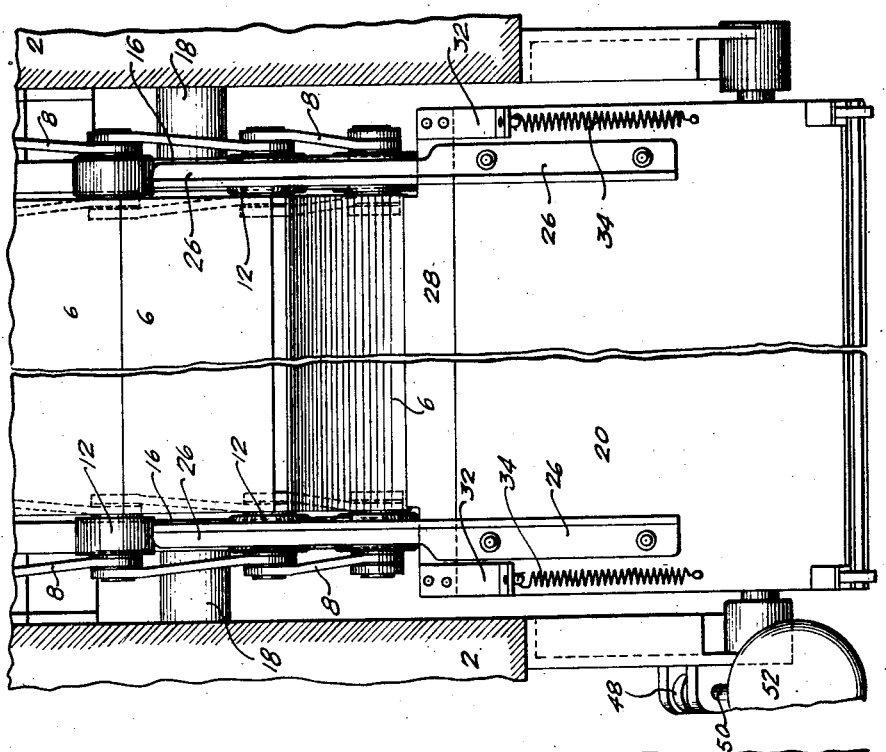
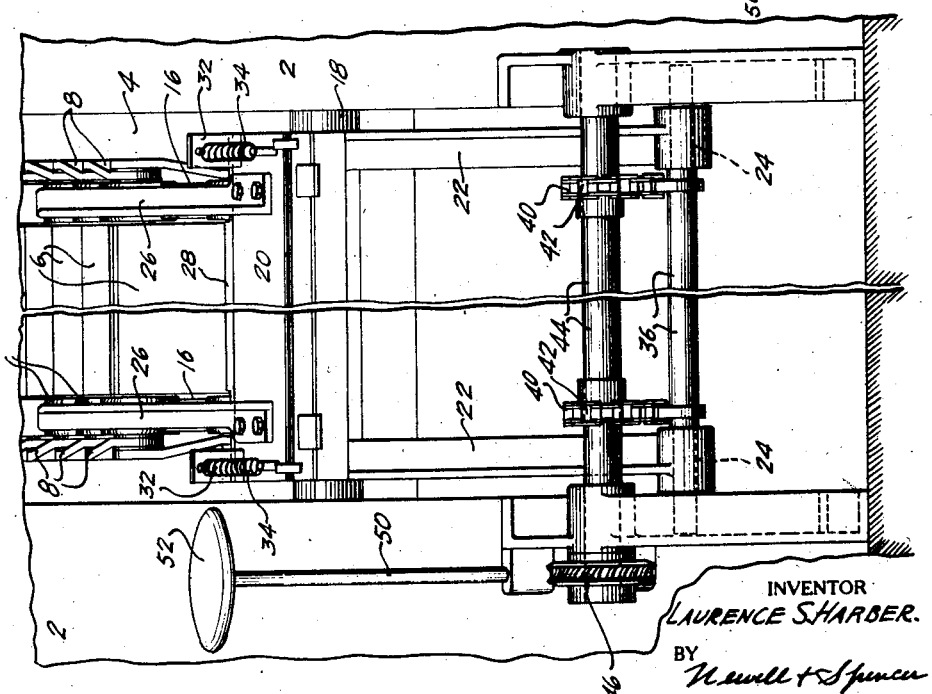

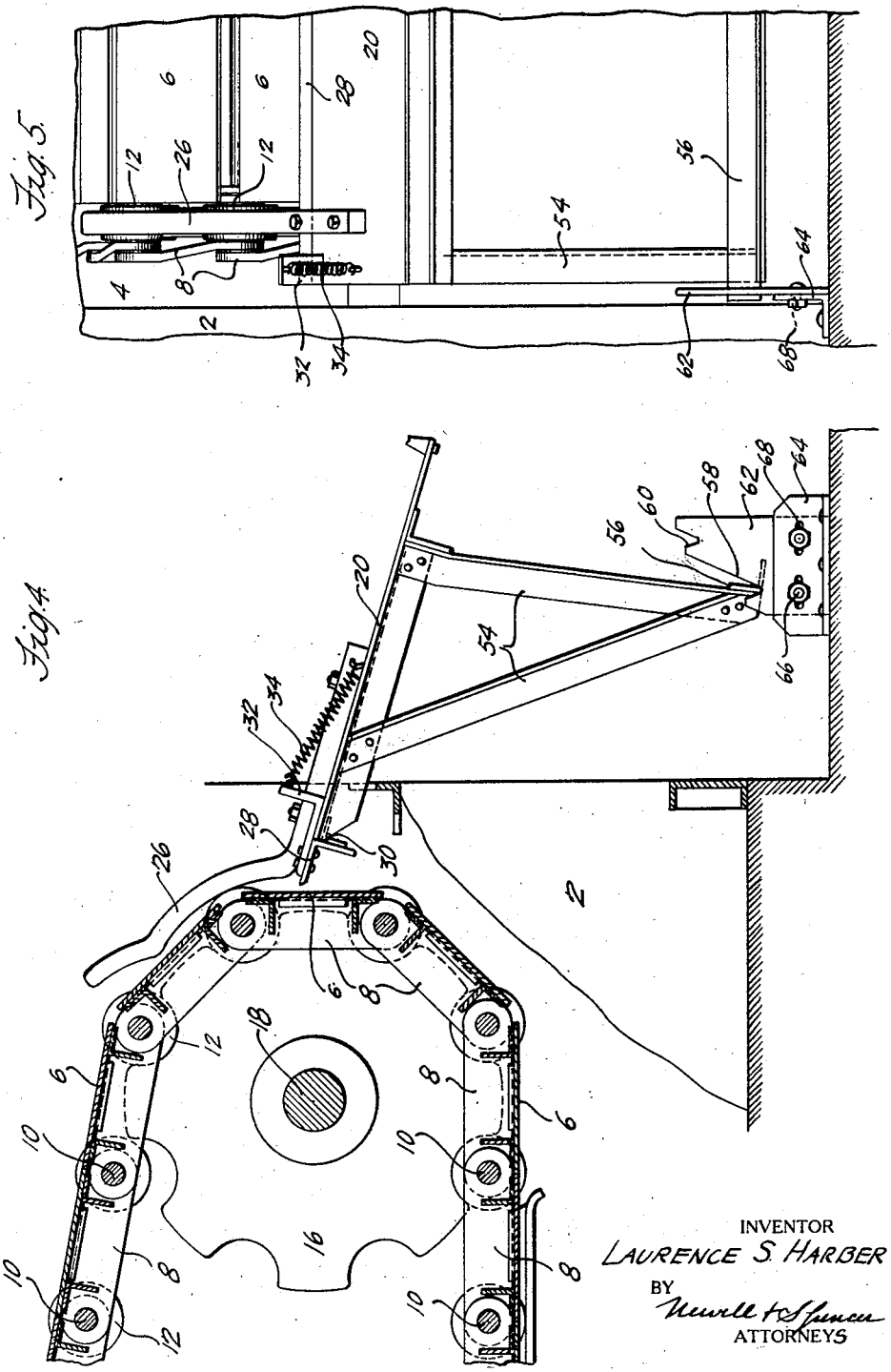

Patented Sept. 29, 1925.

1,555,116

UNITED STATES PATENT OFFICE.

LAURENCE S. HARBER, OF WHITE PLAINS, NEW YORK, ASSIGNOR TO BAKER-PERKINS COMPANY, INC., OF WHITE PLAINS, NEW YORK.

ADJUSTABLE DELIVERY PLATE FOR TRAVELING OVENS.

Application filed November 28, 1923. Serial No. 677,461.

*To all whom it may concern:*

Be it known that I, LAURENCE S. HARBER, a subject of Great Britain, residing at White Plains, county of Westchester, State of New York, have invented a certain new and useful Improvement in Adjustable Delivery Plates for Traveling Ovens, of which the following is a clear, full, and exact description.

This invention relates to bakers' ovens, and more particularly to ovens of the type known in the art as traveling ovens.

In ovens of the traveling type, the baking chamber consists of an elongated housing constructed to insulate the same against the rapid transmission of heat, and a series of baking plates mounted on an endless conveyor arranged to pass from one end of the oven to the other to cary the material therethrough. The oven is provided with openings at its opposite ends through one of which the material is fed and from the other of which the material is delivered at the end of the baking operation. At the delivery end of the oven is located a plate or platform upon which the baked material is deposited from the baking plates by the movement of the conveyor after it is completely baked. To prevent the pans or baked articles from becoming caught between the baking plates and the delivery plate, as they are delivered from the oven, the delivery plate has been pivotally mounted and controlled so that the edge of the delivery plate adjacent the baking plates is maintained at substantially the same distance from the baking plates at all times during the movement of the baking plates about the sprockets at the delivery end of the oven about which sprockets the conveyor passes.

In baking the different kinds of material it is desirable that the delivery plate should be located at different angles with relation to the horizontal. For example, in baking bread, or other material in pans, it is desirable that the delivery plate should be adjusted so that it makes relatively small angle with a horizontal plane. This allows each pan to slide easily down the plate under the force of the next pan as the latter is delivered onto the plate by the conveyor. When rolls are being baked without pans it is desirable that the delivery plate should be located at a greater angle to a horizontal plane so that the rolls will roll down the plate as they are delivered thereon and will be deposited in a suitable receptacle below the outer edge of the plate.

One of the principal objects of the present invention is to improve the construction and mode of operation of traveling ovens and to produce an oven having a delivery plate which will be actuated so that its edge adjacent the baking plates will always be maintained at the same distance from the plates and which may be adjusted to vary the angle thereof as desired.

With this object in view the invention comprises the novel and improved features, constructions and combinations of parts hereinafter described and particularly pointed out in the claims, the advantages of which will be readily understood and appreciated by those skilled in the art.

The invention will be clearly understood from the accompanying drawings illustrating the invention in its preferred form and the following detailed description of the construction therein shown.

In the drawings, Fig. 1 is a view in vertical section of the delivery end of a traveling oven embodying the present invention;

Fig. 2 is a view in end elevation partly broken away of the delivery end of the oven;

Fig. 3 is a plan view partly broken away of the delivery end of the oven;

Fig. 4 is a view similar to Fig. 1, illustrating a modified form of the invention; and Fig. 5 is a view in end elevation of a portion of the delivery end of the oven having the construction shown in Fig. 4.

Figure 1:
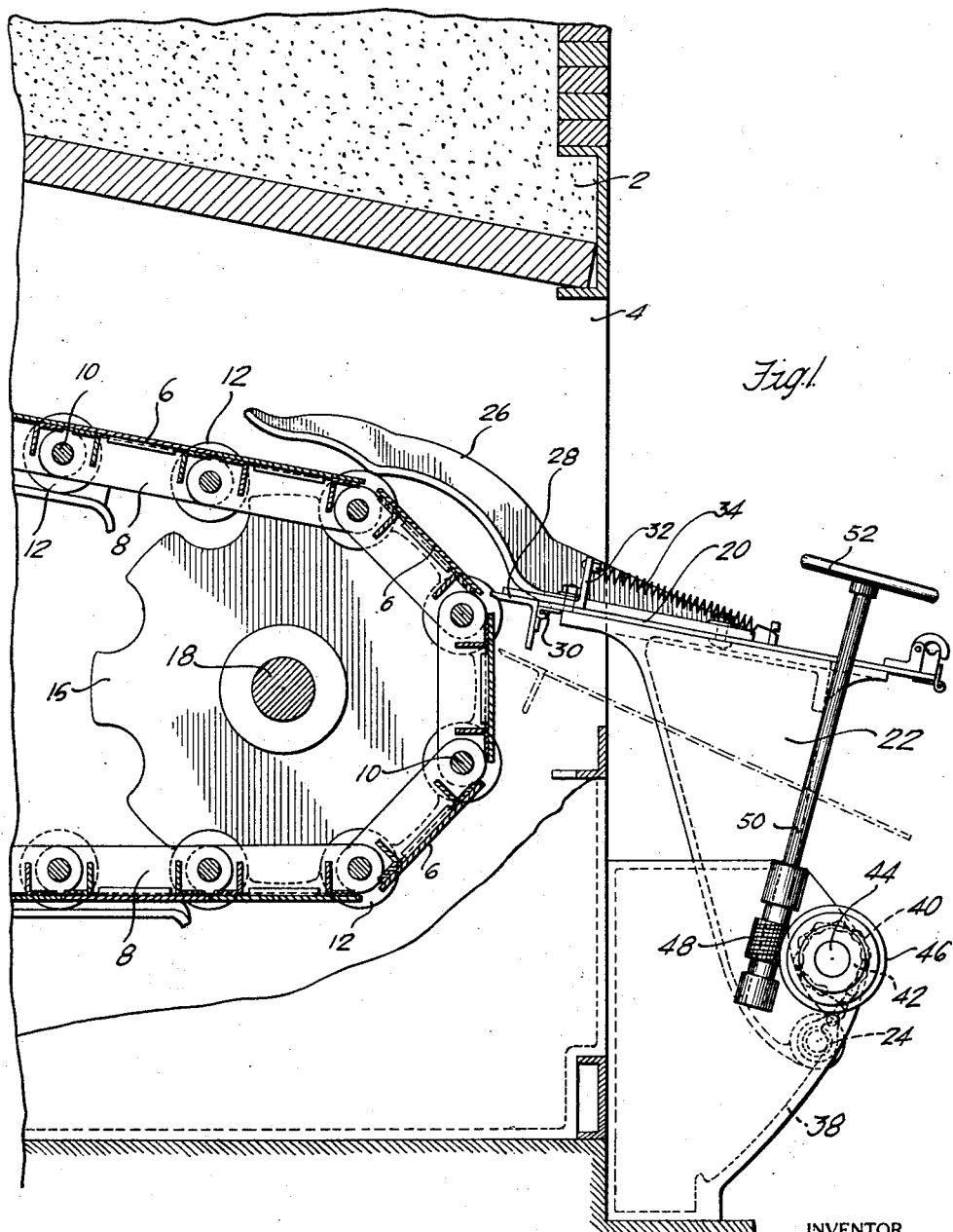

In the form of the invention illustrated in the drawings of this application, the oven comprises an elongated casing indicated at 2, consisting of a framework upon which are built up walls of brick or other suitable insulating material. Within this casing is an elongated baking chamber indicated at 4. through which travel a series of baking plates indicated at 6, mounted on an endless conveyor. This conveyor comprises two conveyor chain structures, one at each end of the series of baking plates, to which the ends of the plates are respectively attached. The conveyor chains each comprise a series of links 8, pivotally connected by means of pins or rods 10 and a series of guide rollers 12 rotatably mounted upon the pins. The inner link 8 of the opposed conveyor chains at opposite sides of the machine are connected by the baking plates to which said links are secured.

The conveyor chains pass about sprocket wheels mounted upon shafts at the opposite ends of the oven, these sprocket wheels having recesses to receive the guide rollers 12. The sprocket wheels at the delivery end of the machine, one of which is indicated at 16, are mounted upon the shaft 18 journalled in bearings at the opposite sides of the oven.

In the present embodiment of the invention the oven is provided with a delivery plate indicated at 20, the inner edge of which is located adjacent to the baking plates as these plates pass about the sprocket wheels 18, so that the baked material is deposited upon the delivery plate by the baking plate. To enable the inner edge of the delivery plate to be maintained at the same distance from the surfaces of the baking plates as they pass this edge of the delivery plate during their movement about the sprocket wheels, the delivery plate is mounted upon supporting brackets 22, pivotally supported at 24 on the frame of the machine. The pivotal position of the delivery plate is controlled by means of a pair of arms 26 secured to opposite ends of the delivery plate and projecting over the delivery end of the traveling conveyor, these arms being arranged to engage the guide rollers 12 in the manner clearly shown in Fig. 1. The contact faces of the arm 26 are curved as illustrated in this figure, so that as the guide rollers turn about the axis of the sprocket wheel 16, the delivery plate will be swung about its axis 24 to maintain the inner edge of the plate always at the same distance from the adjacent surface of the baking plates.

To prevent jamming or breakage of the parts of the machine in the event that a pan or other object should become engaged between the inner edge of the delivery plate and one of the baking plates, the inner portion of the baking plate is mounted so that it can yield downwardly under sufficient force or pressure. To this end the inner part of the delivery plate is formed by one part of an angle iron 28 which is pivoted at 30 to the body of the delivery plate. To the angle iron 28 is secured bracket 32 to which is connected one end of the coiled spring 34, the other end of which is connected with the body of the delivery plate. This coiled spring normally maintains the angle iron 28 in the position shown in the drawings, the pivotal movement of the said iron about its pivot 30 being limited by the contact of the bracket 32 with the body of the delivery plate.

As stated above, the delivery plate is adjustable angularly to enable the same to operate in an efficient manner in delivering different kinds of material received from the baking plates. To enable the angular adjustment of the delivery plate to be readily effected, the pivotal point or axis 24 of the delivery plate is arranged for vertical adjustment. In order that the adjustment of the pivot of the delivery plate may produce substantially no variation in the distance of the inner edge of the delivery plate from the baking plate, the pivot of the delivery plate is arranged for adjustment about the axis of the shaft 18.

In the construction shown in the drawing, the brackets 22 supporting the delivery plate are pivoted upon a shaft 36, the ends of which extend outwardly beyond the brackets and are arranged to engage guides 38 formed on the frame of the machine. The shaft 36 is supported by means of chains 40 each of which has one end connected with the shaft 36, and passes about a wheel 42 attached to a rotatable shaft 44, the other end of the chain being secured to said wheel. The shaft 44 carries at one end a worm wheel 46 meshing with a worm 48 mounted on a shaft 50 extending upwardly above the delivery plate, the upper end of which carries an end wheel 52, by means of which it may be rotated manually. By rotating the hand wheel 52, the shaft 44 is rotated through the connections described to wind up or unwind the chains 40 and thereby adjust the shaft 36 along the guide 38. The inner guiding surfaces of the guides 38 are arcuate in shape, these surfaces conforming to arcs struck from the axis of the shaft 18 as centers.

In the modified form of the invention shown in Figs. 4 and 5, the oven and conveyor structure and the construction and arrangement of the delivery plate and of the mechanism for swinging the plate to maintain the inner edge of the same at substantially the same distance from the baking plates are all substantially as shown in Figs. 1, 2 and 3, the corresponding parts being indicated by the same reference numerals in Figs. 4 and 5. In the construction shown in Figs. 4 and 5, however, the delivery plate is supported on brackets 54, which carry at their lower ends a cross plate 56, the lower edge of which is received in one of the notches 58 and 60, formed in the supporting plates 62. The supporting plates 62 are attached to angle brackets 64, by means of bolts 66, passing through openings in the plates 62 and through slots 68 in the angle brackets. This construction enables the supporting plates 62 to be readily adjusted for a certain distance toward and from the delivery end of the oven.

In this construction the delivery plate is arranged to swing about the point of engagement of the lower edge of the plate 56 with the notch in the supporting plates 62. Notches 58 and 60 are cut in the supporting plates 62 so that the bottoms of the notches are located at substantially the same distance from the axis of the shaft 18. Thus the shifting of the plate 56 from one notch to the other will not produce any variation in the distance of the inner edge of the delivery plate from the baking plates. Since in both of the constructions shown in the drawings of this application the adjustment of the delivery plate to vary the angle thereof takes place about the axis about which the delivery end of the conveyor turns, the adjustment of the delivery plate will produce substantially no variation in the cooperative action of the rollers 12 and the arm 26 in swinging the delivery plate about its axis. The delivery plate will, therefore, have the same mode of operation regardless of its adjusted position.

It is to be understood that the invention is not limited to the particular construction and arrangement of parts of the illustrated embodiment of the invention, but that the invention may be embodied in other forms within the scope of the claims.

Having explained the nature and object of the invention and having specifically described the machine embodying the invention in its preferred form, what is claimed is:

1. A traveling oven having in combination a baking chamber having feed and delivery openings; an endless conveyor arrange for the movement through said chamber; a series of baking plates carried by said conveyor; a pivoted delivery plate having its inner edge located in position to receive material from the baking plates at the delivery end of the conveyor; means for causing movement of the delivery plate to cause the edge thereof adjacent the baking plates to assume positions always at substantially the same distance from said plates during the movement thereof past the delivery plate; and means for adjusting the pivotal point of said plate to vary the angle thereof.

2. A traveling oven having in combination a baking chamber having feed and delivery openings; an endless conveyor arranged for movement through said chamber; a series of baking plates carried by said conveyor; a pivoted delivery plate having its inner edge located in position to receive material from the baking plates at its delivery end of the conveyor; means for causing movement of the delivery plate to cause the edge thereof adjacent the baking plates to assume positions always at substantially the same distance from said plates during the movement thereof past the delivery plate; and means whereby the pivotal point of said plate may be adjusted to vary the angle thereof.

3. A traveling oven having in combination a baking chamber having feed and delivery openings; an endless conveyor arranged for movement through said chamber; a sprocket wheel at the delivery end of the oven over which the conveyor runs; a corresponding sprocket wheel at the receiving end of the oven; a series of baking plates carried by said conveyor; a pivoted delivery plate having its inner edge located in position to receive material from the baking plates at the delivery end of the conveyor; means for causing movement of the delivery plate to cause the edge thereof adjacent the baking plates to assume positions always at the same distance from said plates during the movement thereof past the delivery plate about said sprocket wheel; and means whereby the pivot of the delivery plate may be adjusted about the axis of said first sprocket wheel to vary the angle of said plate.

4. A traveling oven having in combination a baking chamber having feed and delivery openings; an endless conveyor arranged for movement through said chamber; a sprocket wheel at the delivery end of the oven over which the conveyor passes; a corresponding sprocket wheel at the receiving end of the oven; a series of baking plates carried by said conveyor; a pivoted delivery plate having its inner edge located in position to receive material from the baking plates at the delivery end of the conveyor; means for causing movement of the delivery plate to cause the edge thereof adjacent the baking plates to assume positions always at the same distance from said plates during the movement thereof past the delivery plate about said sprocket wheel, and means for adjusting the pivot of the delivery plate about the center of said first sprocket wheel to vary the angle of said plate.

5. A traveling oven having in combination a baking chamber having feed and delivery openings; an endless conveyor arranged for movement through said chamber; a sprocket wheel at the delivery end of the oven over which the conveyor runs; a corresponding sprocket wheel at the receiving end of the oven; a pivoted delivery plate having its inner edge located in position to receive material from the baking plates at the delivery end of the conveyor, a projecting arm on the plate, and means on the conveyor for engaging said arm to swing the delivery plate about its axis to cause the edge thereof adjacent the baking plates to maintain substantially the same position with relation to the plates during the movement of the conveyor about the sprocket wheel past the delivery plate at the delivery end of the conveyor, and means whereby the said delivery plate may be adjusted to vary the angle thereof with substantially no variation in the distance of the inner edge of the delivery plate from the baking plates.

6. A traveling oven having in combination a baking chamber having feed and delivery openings; an endless conveyor arranged for movement through said chamber; a series of baking plates carried by said conveyor; a pivoted delivery plate having its inner edge located in position to receive material from the baking plates at the delivery end of the conveyor; means for causing movement of the delivery plate to cause the edge thereof adjacent the baking plate to assume positions always at substantially the same distance from said plates during the movement thereof past the delivery plate, and means for supporting and adjusting angularly the delivery plate comprising chains upon which the pivot of the delivery plate is supported; guides for guiding the pivot of said plates during the adjustment thereof and means for taking up and letting off the chains.

7. A traveling oven having in combination a baking chamber having feed and delivery openings, an endless conveyor arranged for movement through said chamber, a series of baking plates carried by said conveyor, a delivery plate having its inner edge located in position to receive material from the baking plates at the delivery end of the conveyor, means for causing movement of the delivery plate to cause the edge thereof adjacent the baking plates to assume positions always at the same distance from said plates during the movement thereof past the delivery plate, and means whereby the delivery plate may be adjusted to vary the angle thereof.

8. A traveling oven having in combination a baking chamber having feed and delivery openings, an endless conveyor arranged for movement through said chamber, a series of baking plates carried by said conveyor, a delivery plate having its inner edge located in position to receive material from the baking plates at the delivery end of the conveyor, means for causing movement of the delivery plate to cause the edge thereof adjacent the baking plates to assume positions always at substantially the same distance from said plates during the movement thereof past the delivery plate, and means whereby the angle of the delivery plate may be varied without varying the cooperative action of the baking plates and delivery plate.

9. A traveling oven having in combination a baking chamber, an endless conveyor arranged for movement through said chamber, a series of baking plates carried by said conveyor, a delivery plate having a yielding edge portion arranged to receive material from said baking plates, and means for moving the delivery plate to maintain said edge portion at a substantially uniform distance from the baking plates as said plates are carried about the delivery end of the conveyor.

10. A traveling oven having in combination a baking chamber, an endless conveyor arranged for movement through said chamber, a series of baking plates carried by said conveyor, and a delivery plate having a yielding edge portion arranged to receive material from said baking plates.

11. A traveling oven having in combination a baking chamber, a series of baking plates arranged to travel through said chamber, and a delivery plate for receiving material from said baking plates having its edge portion adjacent the baking plates mounted to yield in the direction of movement of the baking plates.

12. A traveling oven having in combination a baking chamber, a series of baking plates arranged for movement through said chamber, a delivery plate for receiving material from said baking plates having its edge portion adjacent the baking plates pivoted to yield in the direction of movement of said baking plates, a spring for holding said edge portion substantially in the plane of the body of the delivery plate, and a stop for limiting the movement of said edge portion under the action of the spring.

Signed at New York city, New York this 21st day of November, 1923.

LAURENCE S. HARBER